US011248705B2

(12) United States Patent
Sarawate et al.

(10) Patent No.: US 11,248,705 B2
(45) Date of Patent: Feb. 15, 2022

(54) CURVED SEAL WITH RELIEF CUTS FOR ADJACENT GAS TURBINE COMPONENTS

(71) Applicant: General Electric Company, Schenectady, NY (US)

(72) Inventors: Neelesh Nandkumar Sarawate, Niskayuna, NY (US); Christopher Walter Falcone, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 16/256,322

(22) Filed: Jan. 24, 2019

(65) Prior Publication Data
US 2019/0383393 A1  Dec. 19, 2019

Related U.S. Application Data

(63) Continuation-in-part of application No. 16/012,380, filed on Jun. 19, 2018.

(51) Int. Cl.
  *F16J 15/08* (2006.01)
  *F01D 9/02* (2006.01)
  *F23R 3/02* (2006.01)
  *F01D 11/00* (2006.01)

(52) U.S. Cl.
  CPC .......... *F16J 15/0887* (2013.01); *F01D 9/023* (2013.01); *F01D 11/003* (2013.01); *F23R 3/02* (2013.01); *F23R 2900/00012* (2013.01)

(58) Field of Classification Search
  CPC ...... F01D 11/005; F01D 9/023; F01D 11/003; F05D 2240/55; F23R 2900/00012; F16J 15/0887
  See application file for complete search history.

(56) References Cited

U.S. PATENT DOCUMENTS

| 3,947,145 A | * | 3/1976 | Michel | F01D 11/005 |
| | | | | 415/209.4 |
| 4,063,845 A | * | 12/1977 | Allen | F01D 11/005 |
| | | | | 415/134 |
| 4,537,024 A | | 8/1985 | Grosjean | |
| 5,039,014 A | | 8/1991 | Lippmeier | |
| 5,249,920 A | | 10/1993 | Shepherd et al. | |
| 6,527,274 B2 | | 3/2003 | Herron et al. | |

(Continued)

OTHER PUBLICATIONS

Sarawate, Neelesh, et al., U.S. Appl. No. 15/862,520, entitled "Systems and Methods for Assembling Flow Path Components," filed Jan. 4, 2018.

(Continued)

*Primary Examiner* — Eugene G Byrd
(74) *Attorney, Agent, or Firm* — Dority & Manning, P.A.

(57) ABSTRACT

A flexible seal is used to seal between two adjacent gas turbine components. The flexible seal includes at least one metal ply having a forward end, an aft end axially separated from the forward end, and an intermediate portion between the forward end and the aft end. The intermediate portion defines a continuous curve in the circumferential direction, such that the aft end is circumferentially, and optionally radially, offset from the forward end. A plurality of relief cuts is defined through the at least one metal ply between the forward end and the aft end to increase flexibility and improve sealing in seal slots that are radially offset from one another.

16 Claims, 11 Drawing Sheets

(56) References Cited

U.S. PATENT DOCUMENTS

| | | | |
|---|---|---|---|
| 6,561,764 B1 | 5/2003 | Tiemann | |
| 6,821,085 B2 | 11/2004 | Darkins, Jr. et al. | |
| 7,097,423 B2 | 8/2006 | Burdgick | |
| 7,527,469 B2 | 5/2009 | Zborovsky et al. | |
| 7,874,138 B2 | 1/2011 | Rubio et al. | |
| 8,398,090 B2* | 3/2013 | McMahan | F16J 15/061 277/644 |
| 8,545,181 B2 | 10/2013 | Charlton | |
| 8,613,599 B2* | 12/2013 | Lake | F01D 11/006 416/221 |
| 9,482,107 B2 | 11/2016 | Batt | |
| 9,650,919 B2 | 5/2017 | Whitty et al. | |
| 9,771,895 B2* | 9/2017 | Kramer | F02K 1/82 |
| 9,816,393 B2 | 11/2017 | Simon-Delgado et al. | |
| 9,879,555 B2 | 1/2018 | Moehrle et al. | |
| 9,890,651 B2* | 2/2018 | Heaven | F01D 11/00 |
| 9,909,439 B2* | 3/2018 | Bluck | F01D 5/147 |
| 10,378,378 B2* | 8/2019 | Watanabe | C04B 35/806 |
| 10,655,489 B2* | 5/2020 | Sarawate | F01D 11/005 |
| 2003/0039542 A1* | 2/2003 | Cromer | F01D 11/005 415/135 |
| 2003/0122316 A1* | 7/2003 | Aksit | F16J 15/0887 277/409 |
| 2006/0239814 A1* | 10/2006 | Uwami | F01D 11/008 415/134 |
| 2008/0260524 A1* | 10/2008 | Khanin | F01D 11/005 415/177 |
| 2010/0178173 A1* | 7/2010 | Charlton | F01D 11/006 416/248 |
| 2010/0300116 A1* | 12/2010 | Kaleeswaran | F16J 15/0887 60/800 |
| 2012/0139190 A1* | 6/2012 | Doyle | F16L 23/20 277/639 |
| 2012/0304657 A1* | 12/2012 | Melton | F23R 3/60 60/752 |
| 2013/0028713 A1* | 1/2013 | Giri | F16J 15/064 415/135 |
| 2013/0264778 A1* | 10/2013 | Doyle | F16L 23/20 277/602 |
| 2014/0013762 A1* | 1/2014 | Takiguchi | F02C 7/18 60/737 |
| 2014/0053571 A1* | 2/2014 | Keener | F23R 3/286 60/782 |
| 2016/0003079 A1* | 1/2016 | Boeke | F01D 11/005 415/1 |
| 2016/0177762 A1* | 6/2016 | Sarawate | F01D 11/02 60/805 |
| 2016/0281523 A1* | 9/2016 | Mathews | F01D 11/003 |
| 2017/0089211 A1* | 3/2017 | Broomer | F01D 11/005 |
| 2017/0159469 A1* | 6/2017 | Hubley | F16J 15/067 |
| 2017/0276357 A1 | 9/2017 | Berry et al. | |
| 2017/0276358 A1 | 9/2017 | Berry et al. | |
| 2017/0276359 A1 | 9/2017 | Berry et al. | |
| 2017/0276360 A1 | 9/2017 | Berry et al. | |
| 2017/0276361 A1 | 9/2017 | Berry et al. | |
| 2017/0276362 A1 | 9/2017 | Berry et al. | |
| 2017/0276363 A1 | 9/2017 | Berry et al. | |
| 2017/0276364 A1 | 9/2017 | Berry et al. | |
| 2017/0276365 A1 | 9/2017 | Berry et al. | |
| 2017/0276366 A1 | 9/2017 | Berry et al. | |
| 2017/0276369 A1 | 9/2017 | Berry et al. | |
| 2017/0284210 A1* | 10/2017 | Bartley | F01D 9/023 |
| 2017/0298827 A1 | 10/2017 | Berry et al. | |
| 2017/0299185 A1 | 10/2017 | Berry et al. | |
| 2017/0299186 A1 | 10/2017 | Berry et al. | |
| 2017/0299187 A1 | 10/2017 | Berry et al. | |
| 2018/0037511 A1* | 2/2018 | Watanabe | F01D 11/00 |
| 2018/0347366 A1* | 12/2018 | Simonet | F01D 11/005 |
| 2018/0355741 A1* | 12/2018 | Groves, II | F01D 25/12 |
| 2019/0383488 A1* | 12/2019 | Berry | F01D 9/023 |

OTHER PUBLICATIONS

Huber, Thomas, et al., "Investigation of Strip Seal Leakage with Special Focus on Seal Groove Design and Relative Displacement of Sealing Surfaces," Proceedings of ASME Turbo Expo 2017: Turbomachinery Technical Conference, Charlotte, NC, Jun. 26-30, 2017, vol. 5B: Heat Transfer, Paper No. GT2017-64440 (8 pages), American Society oi Mechanical Engineers, New York, NY.

* cited by examiner

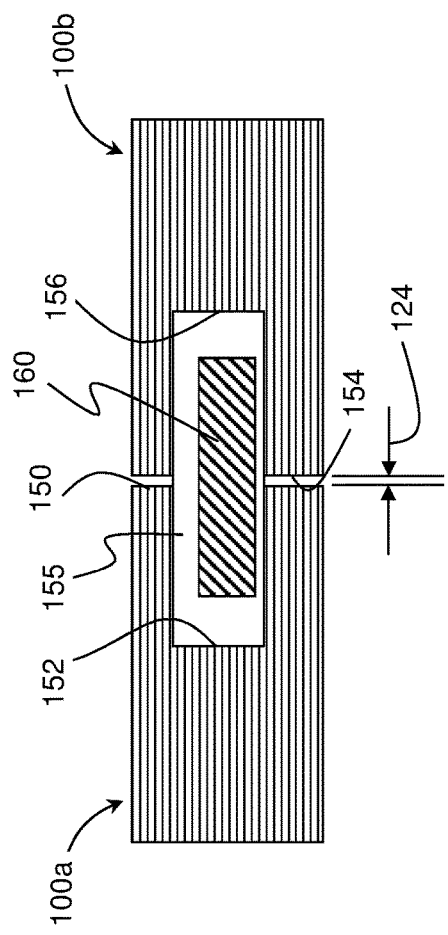
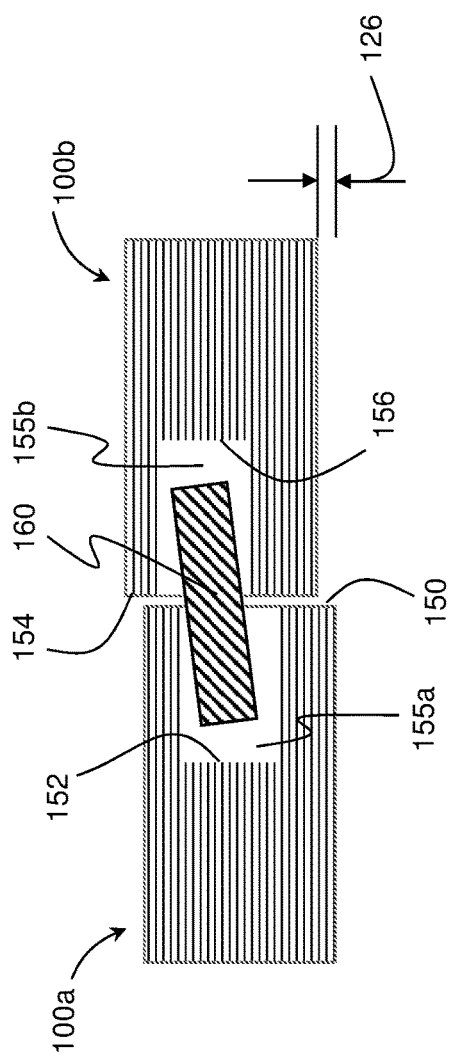

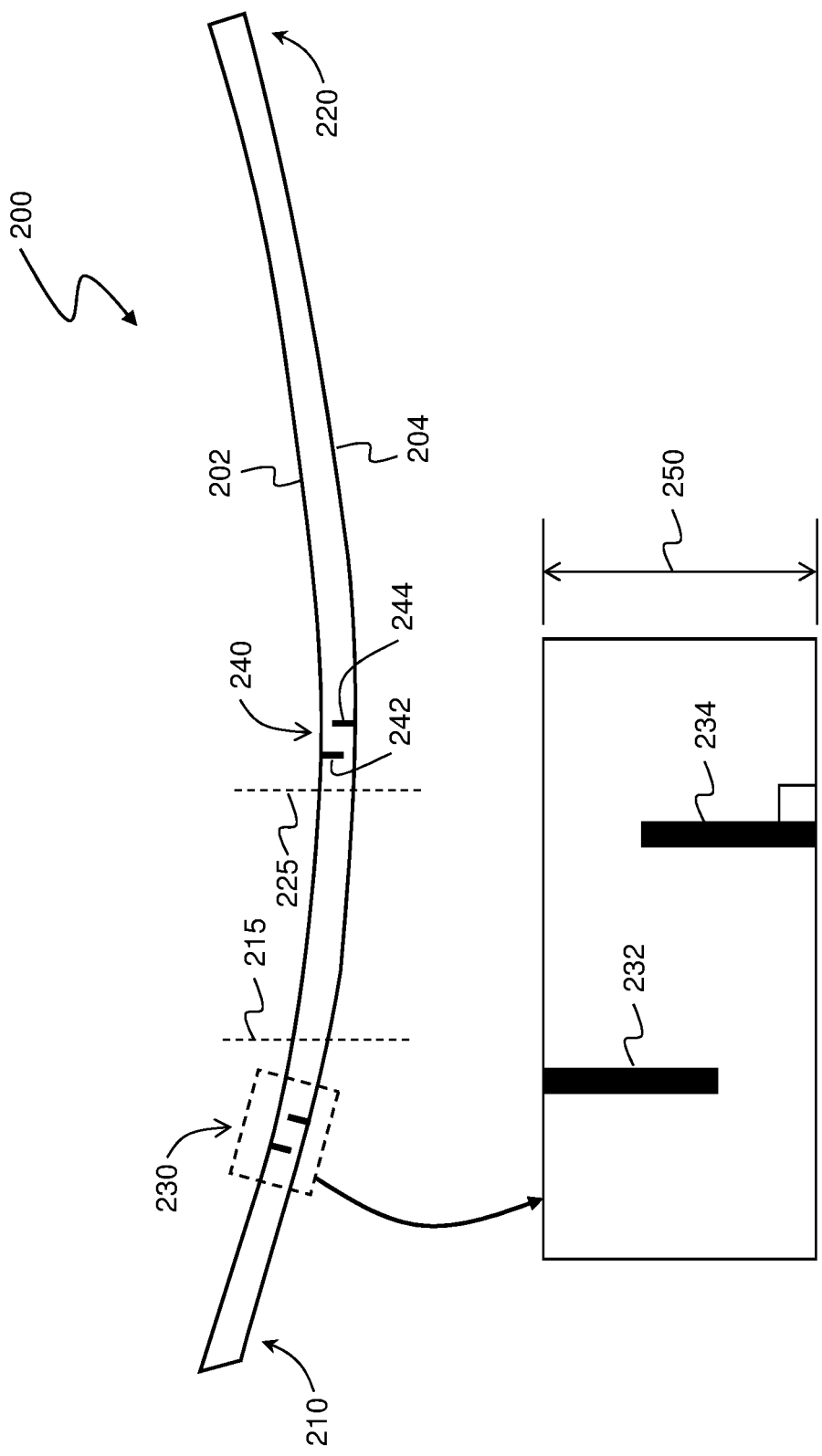

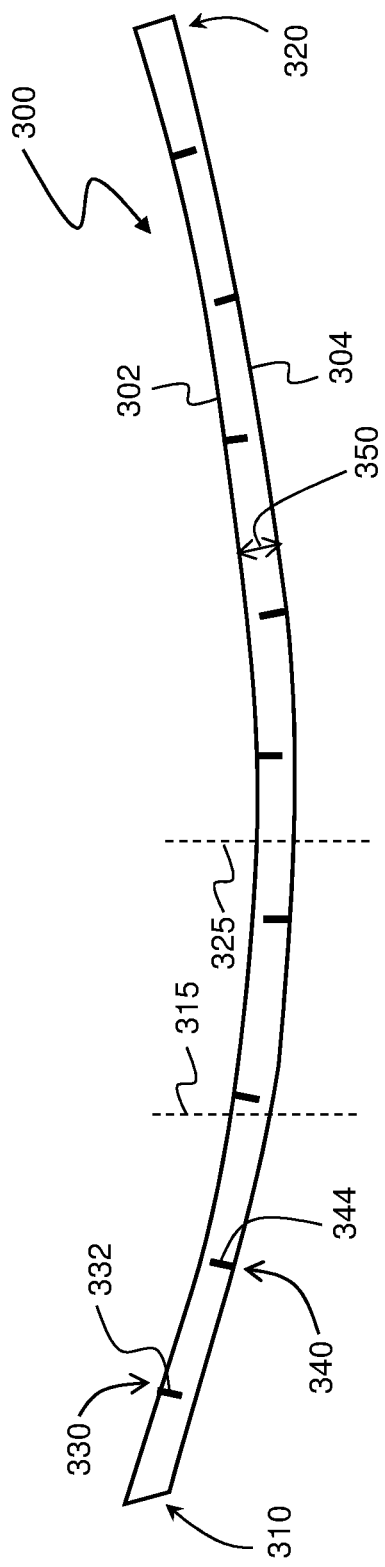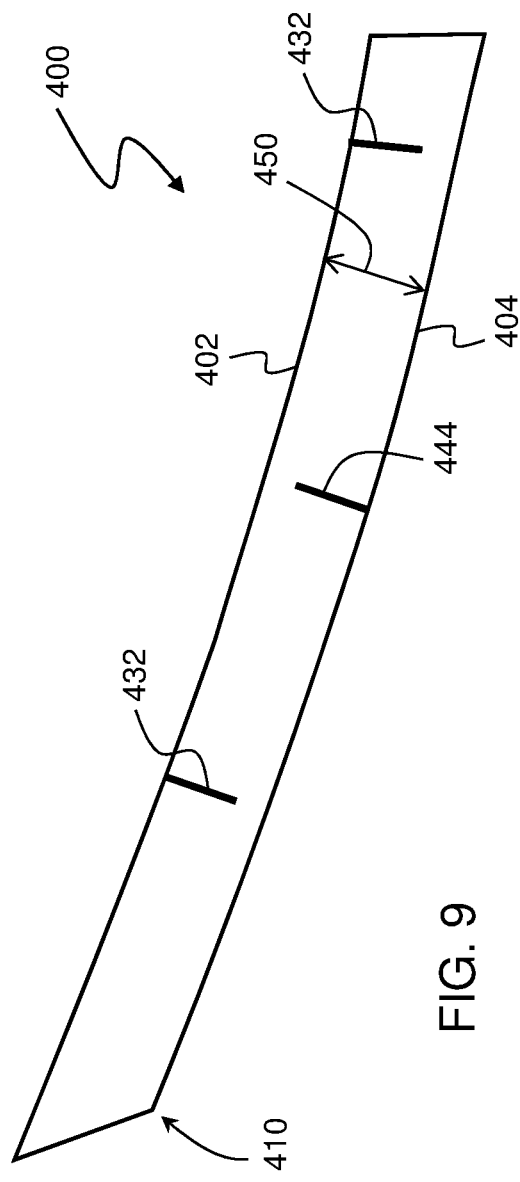

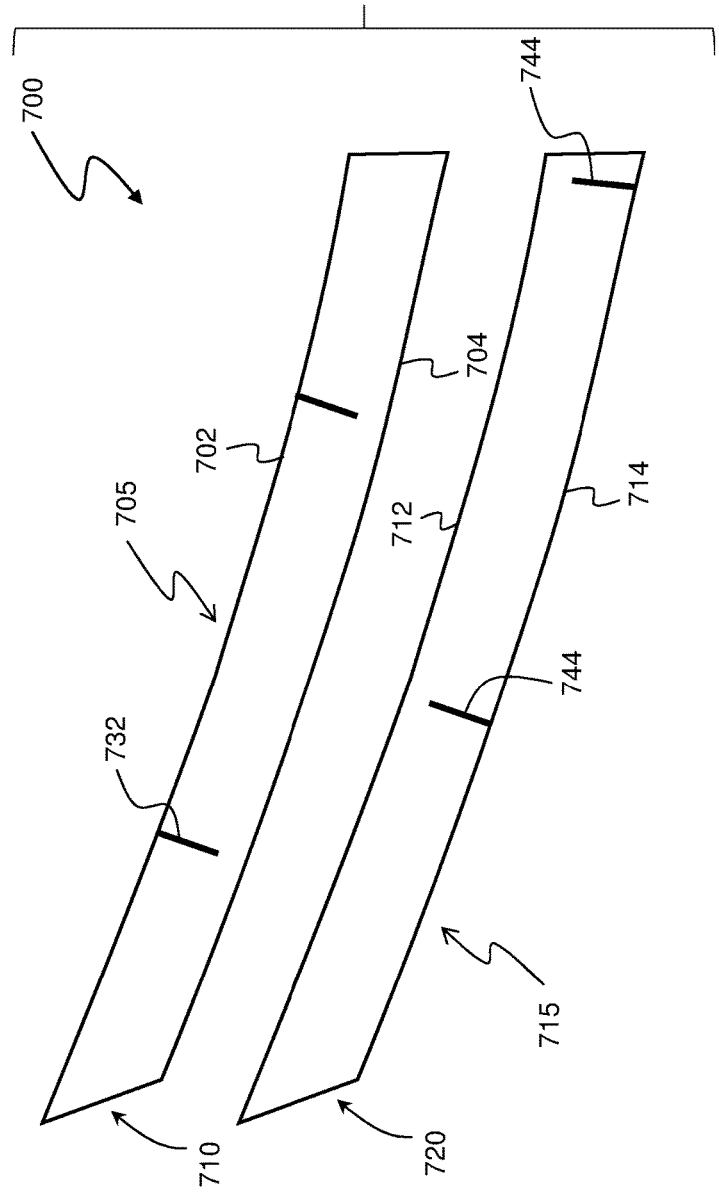

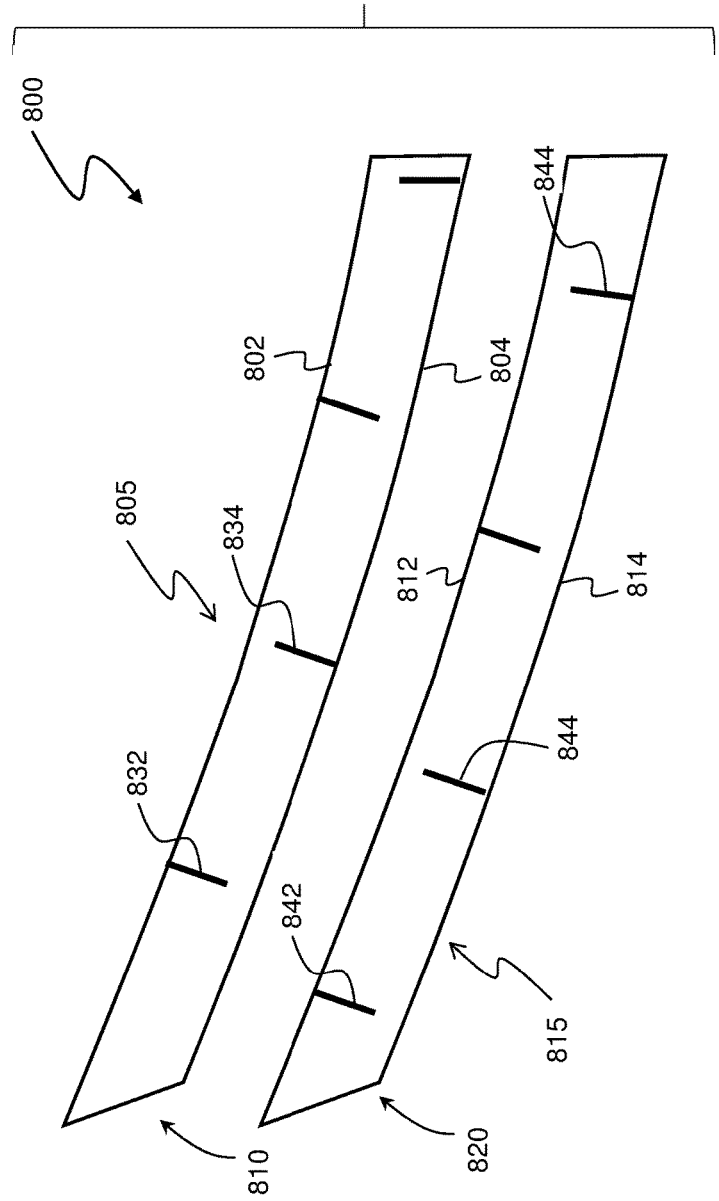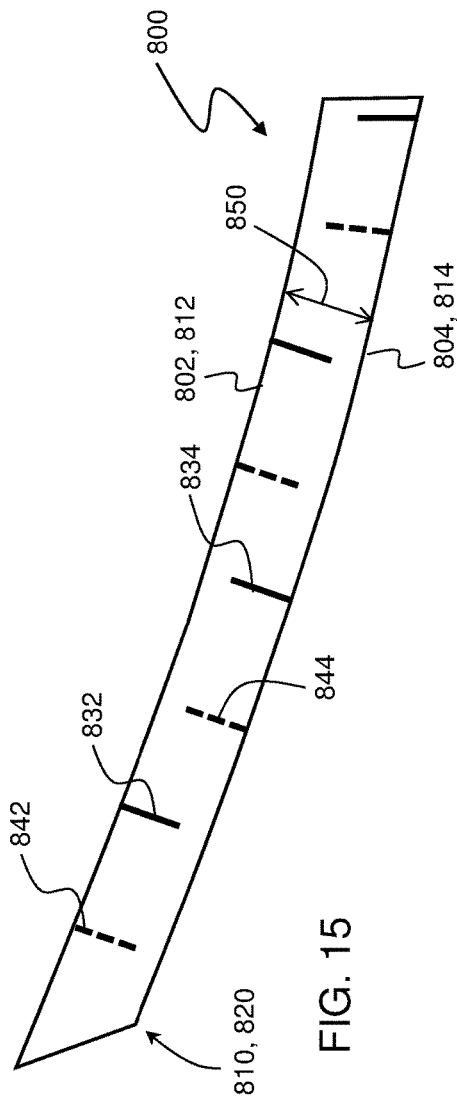

CURVED SEAL WITH RELIEF CUTS FOR ADJACENT GAS TURBINE COMPONENTS

CROSS-REFERENCE TO RELATED APPLICATIONS

The present disclosure is a continuation-in-part application, which claims priority to co-pending U.S. patent application Ser. No. 16/012,380, filed Jun. 19, 2018, the entire disclosure of which is hereby incorporated by reference herein.

STATEMENT REGARDING GOVERNMENT FUNDING

The subject matter of this disclosure was made with support from the United States government, under Contract Number DE-FE0023965, which was awarded by the U.S. Department of Energy. The government has certain rights in this invention.

TECHNICAL FIELD

The present disclosure relates generally to the field of gas turbines and, more particularly, to seals for integrated combustor nozzles that define separate combustion zones within an annular combustor and that accelerate the flow entering the turbine section. The continuously curved seals are configured to seal the inner and outer liner segments to facilitate installation and removal of both the seals and the integrated combustor nozzles from the annular combustor. Relief cuts along the seals ensure that the seal has sufficient flexibility to conform to variations in radial spacing, as may occur along the seal slots due to machine tolerances or temperature variation.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

In recent years, efforts have been made to design can-annular combustion systems in which the first stage of turbine nozzles is integrated with the aft ends of the combustion cans. Such efforts have resulted in a so-called "transition nozzle" that accelerates and turns the flow as it enters the turbine section.

More recently, development efforts have applied the transition nozzle technology in an annular combustion system, leading to the creation of a segmented annular combustion system, as described in commonly assigned U.S. Pat. No. 10,563,869, entitled, "Operation and turndown of a segmented annular combustion system", issued Feb. 18, 2020. In a segmented annular combustion system, the inner liner shell and the outer liner shell are segmented circumferentially into individual modules, and an array of fuel injection panels extends between the inner liner shell segments and the outer liner shell segments of the annular combustor to create a set of units called "integrated combustor nozzles." A plurality of combustion zones is defined between adjacent pairs of integrated combustor nozzles within the annular combustor. The integrated combustor nozzles are shaped like airfoils without a leading edge, and the trailing edge (aft end) of each integrated combustor nozzle defines a turbine nozzle capable of turning and accelerating the flow of combustion gases into the turbine.

To optimize the performance of such a combustion system, it is necessary to seal between adjacent integrated combustor nozzles along the inner liner shell segment and the outer liner shell segment. Initial efforts to seal these components relied upon multiple straight seals that were installed circumferentially into seal slots along the circumferential edges of the liner shell segments. This installation method proved difficult, especially with small seal components, both in maintaining the position of the seal during installation of the subsequent integrated combustor nozzle and in preventing the seal from being crushed (or otherwise damaged) when the subsequent integrated combustor nozzle was installed. Moreover, if one of the seals slipped out of position during installation, the technician was faced with the difficult task of its retrieval from within the turbine.

Another issue with the prior sealing efforts is that, as the seals are installed end-to-end over the axial length of the integrated combustor nozzle, leakages arise between the axial segments of the seal. Such leakages reduce the amount of air flow usable for other purposes, such as cooling or combustion.

Finally, the dogleg shape of the integrated combustor nozzles and the prior sealing efforts made removal of a single integrated combustor nozzle difficult. Because multiple seals were installed end-to-end along the axial length of the integrated combustor nozzle, it was impossible to remove the seals axially. As a result, the integrated combustor nozzles had to be "fanned out" by forcibly shifting the integrated combustor nozzles in a circumferential direction, and the integrated combustor nozzle to be removed had to be wrestled out of its nested position within the array of integrated combustor nozzles.

Previous efforts to address the sealing of the integrated combustor nozzles introduced a single continuous seal. However, variations among the seal slots (as may occur due to machine tolerances or thermal stresses) can cause the single continuous seal to become misaligned, thereby reducing its sealing effectiveness. A seal that can accommodate deviations in the seal slots, while maintaining adequate sealing properties, would be beneficial.

SUMMARY

According to a first aspect, the present disclosure provides a flexible seal for sealing between two adjacent gas turbine components. The flexible seal includes at least one metal ply having a forward end, an aft end axially separated from the forward end, and an intermediate portion between the forward end and the aft end. The intermediate portion defines a continuous curve in the circumferential direction, such that the aft end is circumferentially offset from the forward end. A plurality of relief cuts is defined through the at least one metal ply between the forward end and the aft end.

According to another aspect provided herein, a flexible seal for sealing between two adjacent gas turbine components is provided. The flexible seal includes at least one metal ply having a forward end and an aft end, wherein the aft end is axially, radially, and circumferentially offset from the forward end, such that a continuous circumferential curve is defined between the forward end and the aft end. A plurality of relief cuts is defined through the at least one metal ply between the forward end and the aft end.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which:

FIG. 5 is a schematic illustration of a seal disposed in a radially aligned recess, according to one aspect of the present disclosure;

FIG. 6 is a schematic illustration of a seal disposed in a radially offset recess, according to another aspect of the present disclosure;

FIG. 7 is a plan view of a seal having a first arrangement of relief cuts, according to a first aspect provided herein;

FIG. 8 is a plan view of a seal having a second arrangement of relief cuts, according to a second aspect provided herein;

FIG. 9 is a plan view of a portion of a seal having an arrangement of relief cuts, similar to those shown in FIG. 8;

FIG. 12 is a plan view of end portions of two plies of a seal, in which each ply is provided with relief cuts that are staggered from ply to ply, according to a fourth aspect of the present disclosure;

FIG. 13 is a plan view of a portion of the seal made from the plies of FIG. 12;

FIG. 14 is a plan view of end portions of two plies of a seal, in which each ply is provided with relief cuts that are staggered from ply to ply, according to a fifth aspect of the present disclosure; and FIG. 15 is a plan view of a portion of the seal made from the plies of FIG. 14.

DETAILED DESCRIPTION

Figure 1:
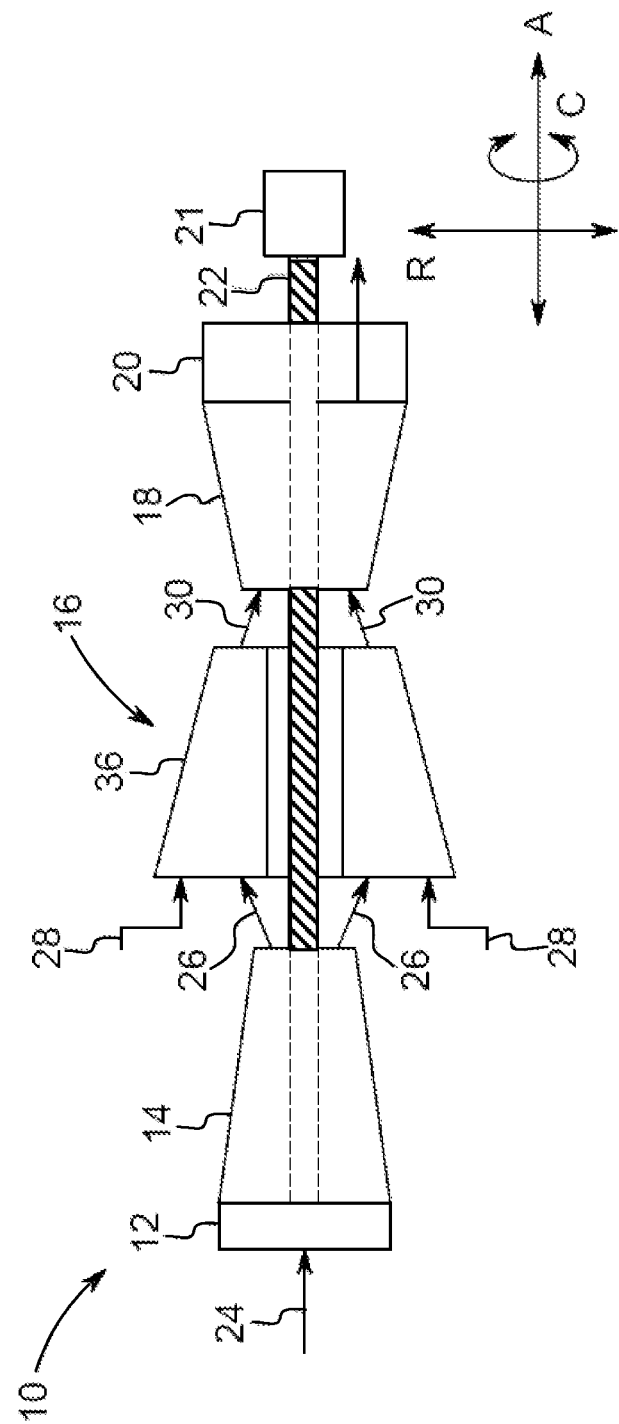
FIG. 1 is a functional block diagram of an exemplary gas turbine that may incorporate various embodiments of the present disclosure.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current integrated combustor nozzle, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft, while the term "outer" is used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a segmented annular combustion system for a land-based power-generating gas turbine for purposes of illustration, one of ordinary skill in the art will readily appreciate that embodiments of the present disclosure may be applied to any type of combustor for a turbomachine and are not limited to annular combustion systems for land-based power-generating gas turbines unless specifically recited in the claims.

Referring now to the drawings, FIG. 1 schematically illustrates an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 (also known as "rotors") that couple the compressor 14 to the turbine 18.

During operation, air 24 flows through the inlet section 12 and into the compressor 14, where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 to into the turbine 18, where thermal and/or kinetic energy are transferred from the combustion gases 30 to rotor blades (not shown) attached to the shaft 22, thereby causing the shaft 22 to rotate. The mechanical rotational energy may then be used for various purposes, such as to power the compressor 14 and/or to generate electricity, via a generator 21 coupled to the shaft 22. The combustion gases 30 exiting the turbine 18 may then be exhausted from the gas turbine 10, via the exhaust section 20.

Figure 2:
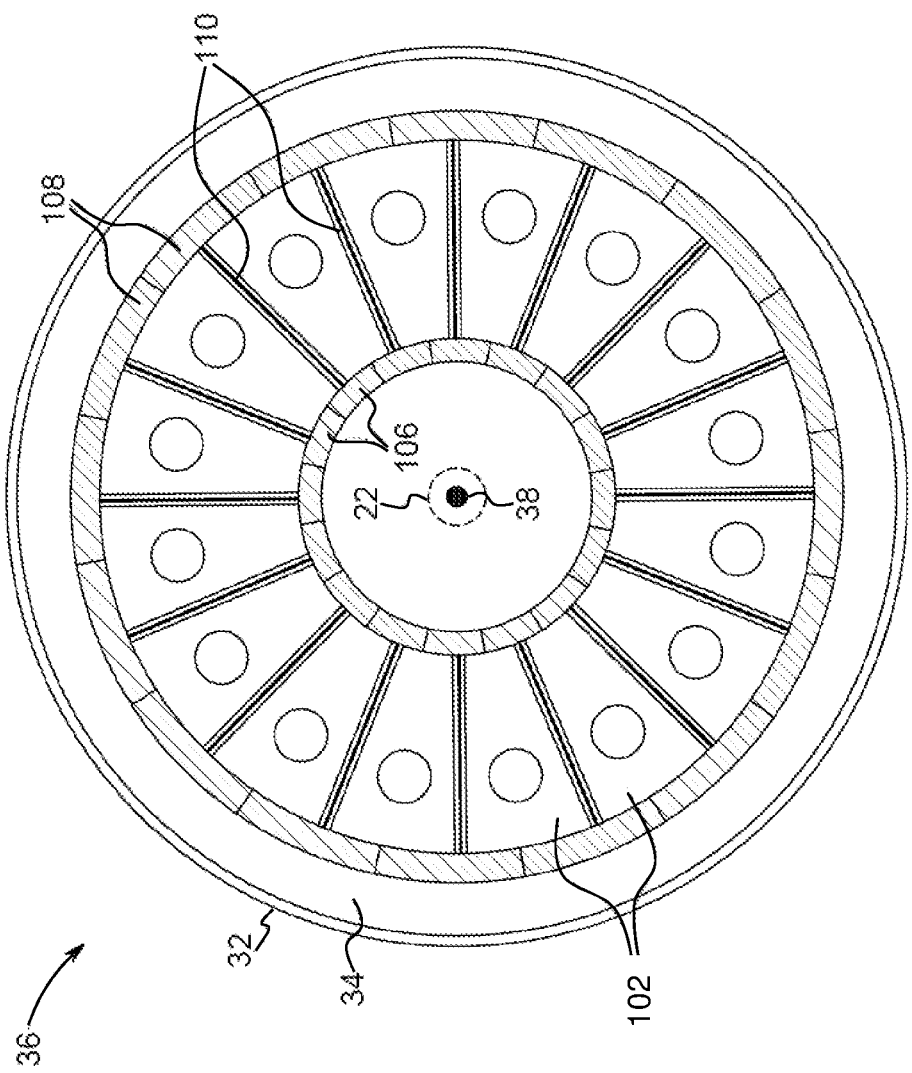
FIG. 2 is an upstream view of an exemplary segmented annular combustor, which may be used as the combustion section of the gas turbine of FIG. 1, according to at least one embodiment of the present disclosure.

FIG. 2 provides an upstream (i.e., an aft-looking-forward) view of the combustion section 16, according to various embodiments of the present disclosure. As shown in FIG. 2, the combustion section 16 may be an annular combustion system and, more specifically, a segmented annular combustor 36 in which an array of integrated combustor nozzles 100 are arranged circumferentially about an axial centerline 38 of the gas turbine 10. The axial centerline 38 may be coincident with the gas turbine shaft 22. The segmented annular combustion system 36 may be at least partially surrounded by an outer casing 32, sometimes referred to as a compressor discharge casing. The compressor discharge casing 32, which receives compressed air 26 from the compressor 14 (FIG. 1), may at least partially define a high-pressure air plenum 34 that at least partially surrounds various components of the combustor 36. The compressed air 26 is used for combustion, as described above, and for cooling combustor hardware.

The segmented annular combustor 36 includes a circumferential array of integrated combustor nozzles 100. Each integrated combustor nozzle 100 includes an inner liner segment 106, an outer liner segment 108 radially separated from the inner liner segment 106, and a hollow or semi-hollow panel 110 extending radially between the inner liner segment 106 and the outer liner segment 108, thus generally defining an "I"-shaped assembly. The panels 110 separate the combustion chamber into an annular array of fluidly separated combustion zones.

Figure 3:
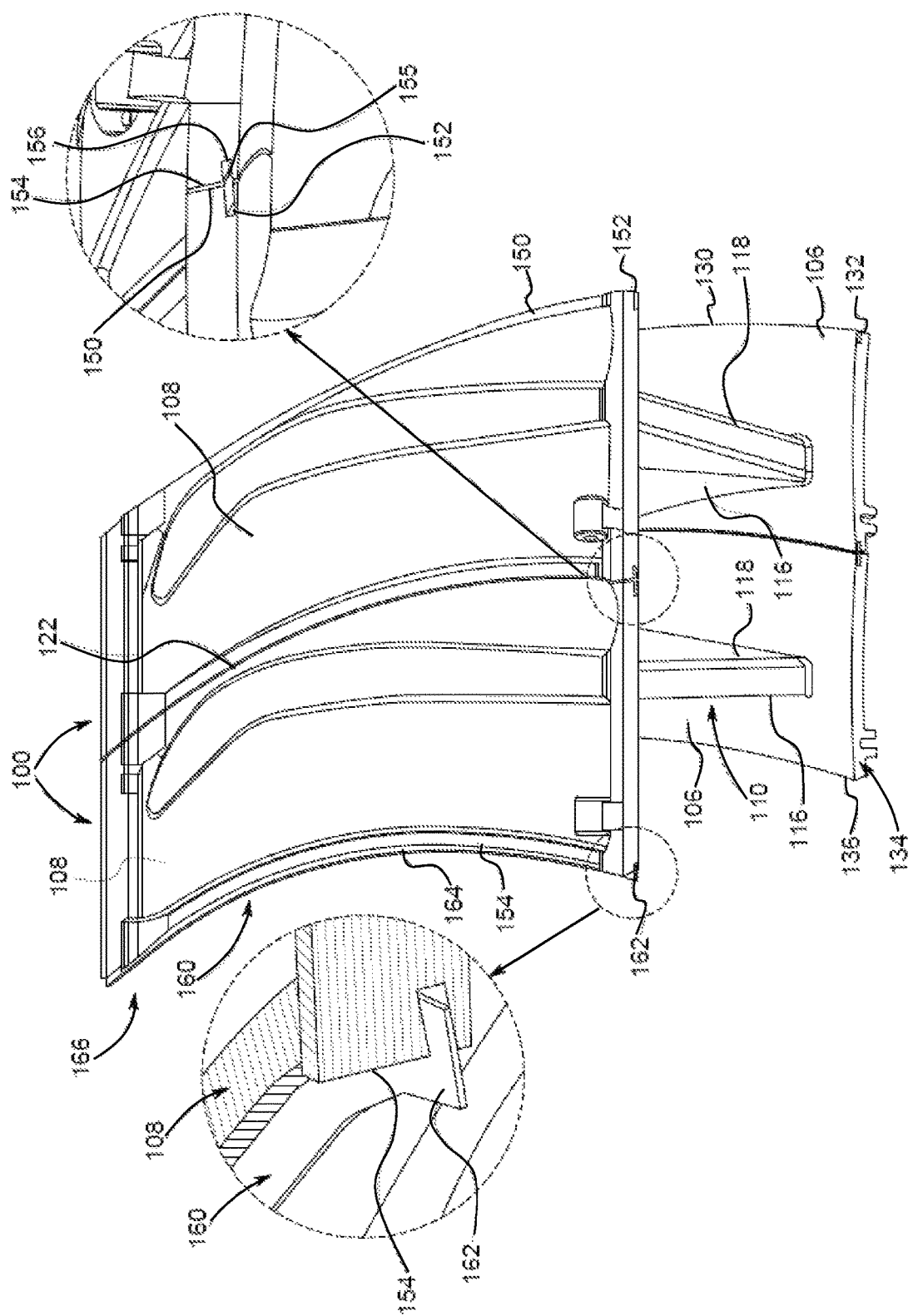
FIG. 3 is an overhead perspective view of two circumferentially adjacent integrated combustor nozzles, including a first call-out bubble illustrating a forward end of a seal and a second call-out bubble illustrating a seal recess, according to the present disclosure.

At the upstream end of the segmented annular combustor 36, a fuel injection module 102 extends circumferentially between each pair of the panels 110 and radially between the inner liner segment 106 and the outer liner segment 108. The fuel injection modules 102 introduce a fuel/air mixture into the combustion zones from a burner, a swirling fuel nozzle (swozzle), or a bundled tube fuel nozzle (e.g., as shown in FIG. 3). Each fuel injection module 102 has at least one fuel conduit supplying the fuel injection modules 102, which, for illustrative purposes, is represented by a circle. If desired for greater operational range (e.g., turn-down) and lower emissions, the panels 110 may also introduce fuel in one or more stages downstream of the combustion zones created by the injection of the fuel/air mixtures delivered by the fuel injection modules 102.

FIG. 3 illustrates a pair of circumferentially adjacent integrated combustor nozzles 100, as shown from a forward end 112. Each integrated combustor nozzle 100 includes an inner liner segment 106, an outer liner segment 108 radially separated from the inner liner segment 106, and a fuel injection panel 110 extending radially between the inner liner segment 106 and the outer liner segment 108. The fuel injection panel 110 includes a first (pressure) side wall 116 and a second (suction) side wall 118 that intersect at an aft end 114 to define a turbine (stage one) nozzle. For the sake of clarity, the fuel injection modules (as described above) are not shown but should be understood as being positioned between the fuel injection panels 110 at the forward ends 112 of the integrated combustor nozzles 100.

Figure 4:
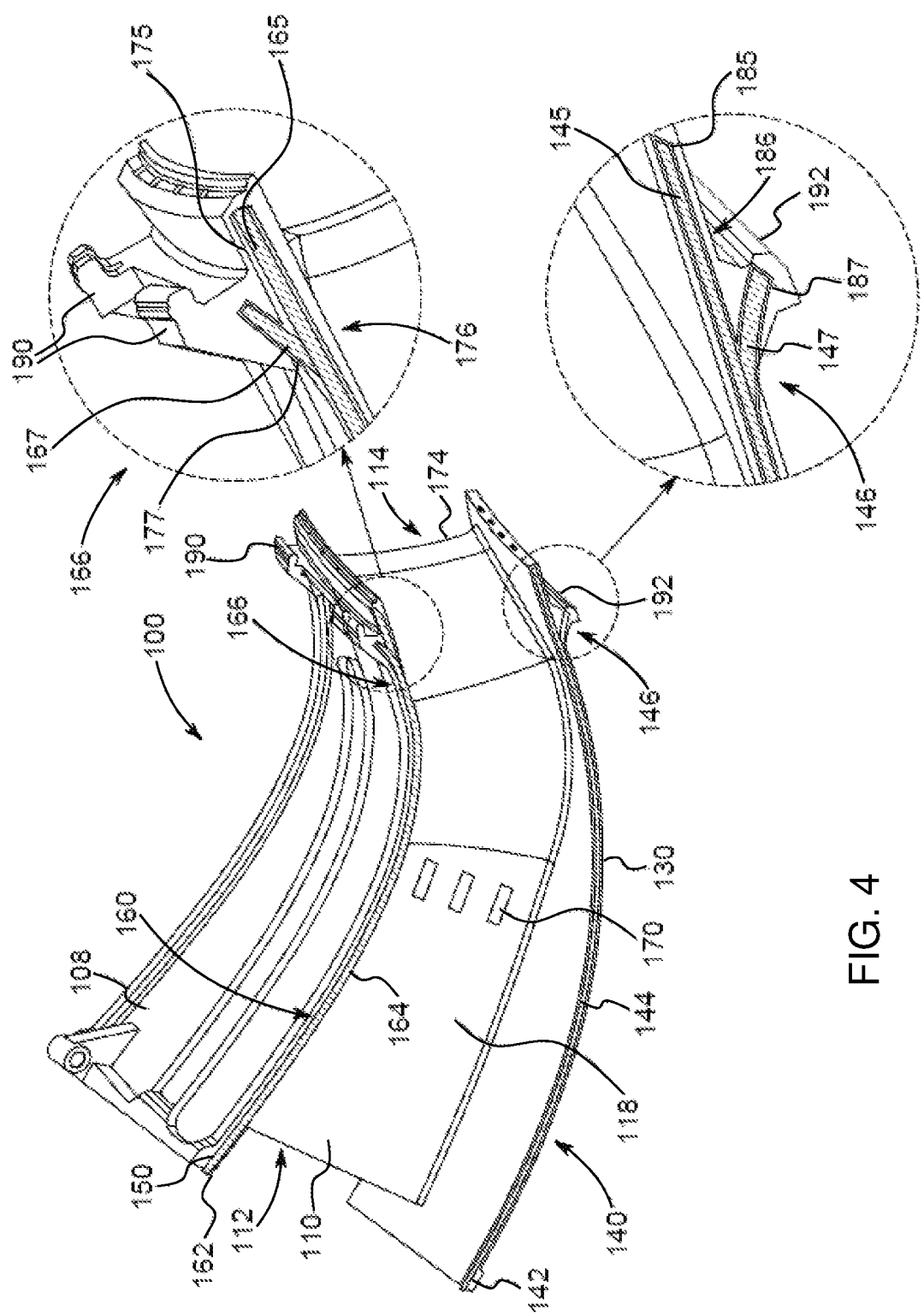
FIG. 4 is a side perspective view of one of the integrated combustor nozzles of FIG. 4, including a first call-out bubble illustrating an aft end slot for the inner liner seal and a second call-out bubble illustrating an aft end slot for the outer liner seal, according to the present disclosure.

The inner liner segment 106 includes a first sealing surface 130 and a second sealing surface 134, both of which extend in an axial direction and curve continuously in a circumferential direction from the forward end 112 to the aft end 114 (shown in FIG. 4). In one embodiment, the sealing surfaces 130, 134 may also curve in a radial direction, optionally with one or more inflection points.

Likewise, the outer liner segment 108 includes a first sealing surface 150 and a second sealing surface 154, both of which extend in an axial direction and curve continuously in a circumferential direction from the forward end 112 to an aft end 114. In one embodiment, the sealing surfaces 150, 154 may also curve in a radial direction, optionally with one or more inflection points.

To facilitate installation and removal of the integrated combustor nozzles 100 and their respective seals 140, 160, the inner and outer liner segments 106, 108 are provided with a curved shape along their respective sealing surfaces 130, 134, 150, 154, according to the following parameters.

As described above, a first parameter is that the curved shape is continuous in the circumferential direction. In some instances, the curved shaped may be "monotonic" in the circumferential direction, meaning that, moving from the forward end to the aft end of the sealing surfaces 130, 134, 150, 154, the curve has a constant radius and has no inflection points where the radius of the curve changes (increases or decreases) to cause a change in the concavity of the curve. (It should be noted that the sealing surfaces 130, 134, 150, 154 may include one or more inflection points only in the radial direction, as descried below.) In some instances, the curved shape may have a continuously decreasing radius from the forward end 112 to the aft end 114, such as may be defined by a parabola or ellipse.

A second parameter is that the curved shape cannot intersect any part of the fuel injection panel 110, including the aft end 114. Because the fuel injection panel 110 is a discrete unit designed with fuel delivery passages to deliver fuel to the downstream combustion zones and separate air passages to ensure adequate cooling of the fuel injection panel 110, disrupting the flow of fluids through the fuel injection panel 110 is undesirable and would further complicate the sealing of adjacent integrated combustor nozzles 100.

A third parameter is that the same curved profile is used for the inner liner segment 106 and the outer liner segment 108. Said differently, the curved profile is translated radially through both the both inner liner segment 106 and the outer liner segment 108. Such a configuration permits the installation and removal of individual integrated combustor nozzles 100 in a generally axial direction, pushing or pulling the integrated combustor nozzles 100 along the curve and into or out of position.

Yet another parameter is that all the integrated combustor nozzles 100 are identical in the curved profile of the sealing surfaces 130, 134, 150, 154 of the inner liner segments 106 and the outer liner segments 108. There is no "key" integrated combustor nozzle 100 that is slightly different from the other integrated combustor nozzles 100 to secure the position of the annular array of integrated combustor nozzles 100. Rather, because each integrated combustor nozzle 100 is identically shaped, any of the integrated combustor nozzles 100 may be removed from the annular array without displacing the adjacent integrated combustor nozzles 100. Such an arrangement simplifies and shortens maintenance intervals, in the event that a single integrated combustor nozzle 100 requires inspection or maintenance.

Returning again to FIG. 3, on the inner liner segment 106, the first sealing surface 130 defines a first seal slot 132, and the second sealing surface 134 defines a second seal slot 136. The first seal slot 132 of a first inner liner segment 106 mates with the second seal slot 136 of a second inner liner segment 106 to define a recess 135 within which an inner liner seal 140 is installed.

On the outer liner segment 108, the first sealing surface 150 defines a first seal slot 152, and the second sealing surface 154 defines a second seal slot 156. As shown in a first call-out bubble in FIG. 3, the first seal slot 152 of a first outer liner segment 108 mates with the second seal slot 156 of a second outer liner segment 108 to define a recess 155 within which an outer liner seal 160 is installed. As shown in a second call-out bubble in FIG. 3, when the outer liner seal 160 is fully installed in the recess 155, a forward end 162 of the outer liner seal 160 is disposed within the seal slots 152, 156 defined between the sealing surfaces 150, 154.

The seal slots 132, 136, 152, and/or 156 may be normal (i.e., at a right angle) to the respective sealing surfaces 130, 134, 150, 154, and may be symmetrically sized and shaped about the joint 122 with each seal slot extending inwardly over a uniform distance from the sealing surface (as shown in FIG. 5). Alternately, the seal slots 132, 136, 152, and/or 156 may be disposed at an angle relative to the respective sealing surfaces 130, 134, 150, 154 and may be asymmetrically sized and shaped about the joint 122 (not shown).

FIG. 4 illustrates a single integrated combustor nozzle 100 in which the inner liner seal 140 and the outer liner seal 160 are installed in respective slots (132, 152) in the inner liner segment 106 and the outer liner segment 108. As illustrated, the fuel injection panel 110 extends radially between the inner liner segment 106 and the outer liner segment 108 and includes a plurality of injection outlets 170 from which a fuel/air mixture is introduced into a secondary combustion stage. The aft end 114 of the integrated combustor nozzle 100 has an airfoil shape with a trailing edge 174, reminiscent of a stage-one turbine nozzle, to turn and accelerate the flow of combustion products 30 into the turbine section 18 (shown in FIG. 1).

The outer liner seal 160 has a forward end 162, an aft end 166, and an intermediate section 164 extending between the forward end 162 and the aft end 166. The forward end 162 of the outer liner seal 160 fits within the seal slot 152 in the sealing surface 150 of the outer liner segment 108, as described above.

In the illustrated embodiment, the seal slot 152 (or 156) is open at the forward end 112 of the outer liner segment 108 and closed at the aft end 114 of the outer liner segment 108. The installation of the outer liner seal 160 may be accomplished by inserting, in an axial direction, the aft end 166 of the seal 160 into the recess 155 defined by the respective seal slots 152, 156 in each circumferential sealing surface 150, 154 of the two adjacent gas turbine components (i.e., the two integrated combustor nozzles 100), where the seal 160 has the aft end 166 axially and circumferentially offset from the forward end 162; and pushing the seal 160 in an axial direction through the recess 155 until the forward end 162 is disposed within the recess 155.

Alternately, if the seal slot 152 is open at the aft end 114 of the outer liner segment 108, the outer liner seal 160 may be installed, in the axial direction, from the aft end 114.

As with the outer liner seal 160, the inner liner seal 140 has a forward end 142, an aft end 146, and an intermediate section 144 extending between the forward end 142 and the aft end 146.

In the illustrated embodiment, the seal slot 132 (or 136) is open at the forward end 112 of the inner liner segment 106 and closed at the aft end 114 of the inner liner segment 106. The installation of the inner liner seal 140 may be accomplished by inserting, in an axial direction, the aft end 146 of the seal 140 into the recess 135 defined by the respective seal slots 132, 136 in each circumferential sealing surface 130, 134 of the two adjacent gas turbine components (i.e., the two integrated combustor nozzles 100), where the seal 140 has the aft end 146 axially and circumferentially offset from the forward end 142; and pushing the seal 140 in an axial direction through the recess 135 until the forward end 142 is disposed within the recess 135.

Alternately, if the seal slot 132 is open at the aft end 114 of the inner liner segment 106, the inner liner seal 140 may be installed, in the axial direction, from the aft end 114.

FIG. 4 also provides enlarged views of the aft end 166 of the outer liner seal 160 and the aft end 146 of the inner liner seal 140. In the exemplary embodiment shown, the sealing surface 150 (or 154) at the aft end 114 of the outer liner segment 108 may diverge radially outward from the seal slot 152 (or 156) due to the presence of mounting hook(s) 190 provided on the outer surface of the outer liner segment 108.

The aft end 146 of the inner liner seal 140 may be bifurcated (i.e., divided into two branches) to fit within a corresponding bifurcated downstream slot 186. In the exemplary embodiment, a second branch 147 of the aft end 146 of the outer liner seal 140 is shorter than a first branch 145 of the aft end 146 of the inner liner seal 140, although, in other embodiments, the second branch 147 may be of equal length as the first branch 145 or may be longer than the first branch 145.

The first branch 145 of the aft end 146 of the inner liner seal 140 is configured to fit within a first (axially-oriented) portion 185 of the downstream slot 186, the first portion 185 of the downstream slot 186 being continuous with the seal slot 132 (or 136). The second branch 147 of the aft end 146 of the inner liner seal 140 is configured to fit within a second (angled) portion 187 of the downstream slot 186, the second portion 187 of the downstream slot 186 being disposed within an inner hook plate 192 at an angle relative to the first portion 185 of the downstream slot 186. The angle of the divergence between the first branch 145 and the second branch 147 is in a range from about 5 degrees to about 75 degrees.

The aft end 166 of the outer liner seal 160 may be bifurcated (i.e., divided into two branches) to fit within a corresponding bifurcated downstream slot 176. In the exemplary embodiment, a second branch 167 of the aft end 166 of the outer liner seal 160 is shorter than a first branch 165 of the aft end 166 of the outer liner seal 160, although, in other embodiments, the second branch 167 may be of equal length as the first branch 165 or may be longer than the first branch 165.

The first branch 165 of the aft end 166 of the outer liner seal 160 is configured to fit within a first (axially-oriented) portion 175 of the downstream slot 176, the first portion 175 of the downstream slot 176 being continuous with the seal slot 152 (or 156). The second branch 167 of the aft end 166 of the outer liner seal 160 is configured to fit within a second (angled) portion 177 of the downstream slot 176, the second portion 177 of the downstream slot 176 being disposed within the mounting hook(s) 190 at an angle relative to the first portion 175 of the downstream slot 176. The angle of the divergence between the first branch 165 and the second branch 167 of the outer liner seal 160 is in a range from about 5 degrees to about 75 degrees.

Based on the size of the integrated combustor nozzles 100, the inner liner seal 140 and the outer liner seal 160 may range in size from about 18 inches to about 42 inches. However, the seals illustrated herein are useful for sealing other turbine components, where the seal lengths may range from about 5 inches to about 50 inches.

FIG. 5 schematically illustrates a seal (e.g., an outer liner seal 160) disposed in a recess 155 created by two radially aligned seal slots 152, 156 of uniform, or approximately uniform, width. In this configuration, the sealing surfaces 150, 154 of the integrated combustor nozzles 100a, 100b are separated from one another by a small circumferential gap 124. This illustration could be equally adapted to refer to the inner liner seal 140 in the recess 135.

FIG. 6 schematically illustrates an arrangement in which the first integrated combustor nozzle 100a is radially offset from the second integrated combustor nozzle 100b by a radial offset distance 126. Such an offset may occur due to machine tolerance stack-ups, for example. In this instance, the seal slot 152 defines a first recess 155a, and the seal slot 156 defines a second recess 155b.

It should be noted that the radial gap 126 may occur at any point along the length of the seal slots 132, 136, 152, 156. Therefore, the seals 140, 160 require sufficient flexibility to be pushed (or pulled) through the recesses 135, 155, even if the respective slots are slightly offset from one another in the radial direction. It has been found that providing relief cuts in the seals 140, 160 increases the flexibility of the seals and facilitates their installation and removal, while maintaining proper sealing function within the recesses 135, 155.

FIG. 7 illustrates an exemplary seal 200, which may function as either the inner liner seal 140 or the outer liner seal 160, according to a first aspect of the present disclosure. The seal 200 is a thin metal strip and may include one or more seal plies. The plies may or may not be of equal thickness. In one exemplary seal 200, the seal 200 includes two plies stacked and, optionally, joined together. The seal 200 has the curved shape described above to facilitate installation between the respective integrated combustor nozzles 100.

As shown, the seal 200 includes a first edge 202 and a second edge 204 that extend between a forward end 210 and an aft end 220. Between the forward end 210 and the aft end 220, the seal 200 includes a pair of inflection points 215, 225. A first pair 230 of oppositely disposed and axially spaced relief cuts 232, 234 is positioned between the forward end 210 of the seal 200 and the first inflection point 215. A second pair 240 of oppositely disposed and axially spaced relief cuts 242, 244 is positioned between the second inflection point 225 and the aft end 220 of the seal 200. The spacing between the relief cuts 232, 234 in the first pair 230 may or may not be the same as the spacing between the relief cuts 242, 244 in the second pair 240. Depending on the length of the seal 220, the spacing between the relief cuts 232, 234 and the spacing between the relief cuts 242, 244 may be between 0.5 inches and 1.0 inches.

The relief cuts 232, 242 extend inwardly in a first direction from the first edge 202, while the relief cuts 234, 244 extend inwardly in a second direction from the second edge 204. The relief cuts 232, 234, 242, 244 extend from at least 40% of the seal width 250 to 65% of the seal width 250. If more than one seal ply is used, the relief cuts 232, 234, 242, 244 are made through each ply in the same locations.

FIG. 8 illustrates an exemplary seal 300, which may function as either the inner liner seal 140 or the outer liner seal 160, according to a second aspect of the present disclosure. The seal 300 is a thin metal strip and may include one or more seal plies. The plies may or may not be of equal thickness. In one exemplary seal 300, the seal 300 includes two plies stacked and, optionally, joined together. The seal 300 has the curved shape described above to facilitate installation between the respective integrated combustor nozzles 100.

As shown, the seal 300 includes a first edge 302 and a second edge 304 that extend between a forward end 310 and an aft end 320. Between the forward end 310 and the aft end 320, the seal 300 includes a pair of inflection points 315, 325. A first set 330 of axially spaced relief cuts 332 is positioned between the forward end 310 of the seal 300 and the aft end 320 of the seal 300 with the relief cuts 332 extending inwardly from the first edge 302. A second set 340 of axially spaced relief cuts 344 is positioned between the forward end 310 and the aft end 320 of the seal 300 in staggered relationship to the relief cuts 332 of the first set 330. The relief cuts 344 of the second set 340 extend inwardly from the second edge 304.

The relief cuts 332, 344 extend inwardly from a respective edge 302, 304 over a distance from at least 40% of the seal width 350 to 65% of the seal width 350. If more than one seal ply is used, the relief cuts 332, 344 are made through each ply in the same locations.

The spacing between the relief cuts 332, 344 the first set 330 and the second set 340 may be equidistant. In one exemplary seal 300 having a length of 30 inches, the spacing between the relief cuts 332, 344 may be approximately 3 inches (+/−5%). In this instance, nine relief cuts 332, 344 may be equidistantly spaced at every 3 inches, in which case the first set 320 would include five relief cuts 332, and the second set 330 would include four relief cuts 344. In other embodiments, the relief cuts 332, 344 may be spaced non-uniformly, and/or the number of relief cuts 332, 344 in each set 330, 340 may be the same.

FIG. 9 is an enlarged plan view of a forward end 410 of a seal 400, which has a similar pattern of relief cuts as those shown in FIG. 8. In this embodiment, the number of relief cuts 432, 444 is increased, as compared to the embodiment shown in FIG. 8. For example, according to this embodiment, a thirty-inch seal 400 is provided with relief cuts 432, 444 that are spaced at intervals of approximately 1.0 inches (+/−5%), resulting in twenty-nine (29) relief cuts 432, 444. The relief cuts 432, 444 are staggered (i.e., axially offset) with respect to one another.

As in FIG. 8, one set of relief cuts 432 extend inwardly from a first edge 402, while the other set of relief cuts 444 extend inwardly from a second edge 404. The relief cuts 432, 444 extend from the respective edges 402, 404 over a distance from at least 40% of the seal width 450 to 65% of the seal width 450. If more than one seal ply is used, the relief cuts 432, 444 are made through each ply in the same locations. If more than one seal ply is used, the seal plies may be joined together in a continuous manner (e.g., by adhesive) or a discontinuous manner (e.g., by spot welding).

Figure 10:
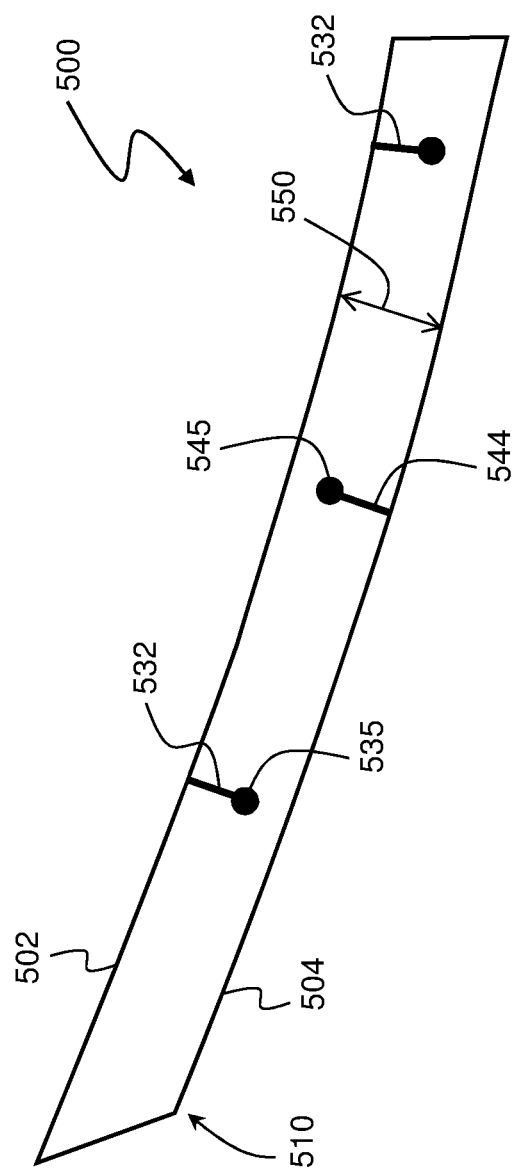
FIG. 10 is a plan view of a portion of a seal having an alternate style of relief cuts, which are disposed in the arrangement shown in FIG. 9.

FIG. 10 is an enlarged plan view of a forward end 510 of a seal 500, which is a variation of the seal 400 of FIG. 9. In this embodiment, the relief cuts 532, 544 are provided with a stress-relieving feature 535, 545 at the respective inward ends of the relief cuts 532, 544. As in FIGS. 8 and 9, one set of relief cuts 534 extend inwardly from a first edge 502, while the other set of relief cuts 544 extend inwardly from a second edge 504. The relief cuts 532, 544 extend from the respective edges 502, 504 over a distance from at least 40% of the seal width 550 to 65% of the seal width 550. If more than one seal ply is used, the relief cuts 532, 544 are made through each ply in the same locations. The spacing of the relief cuts 532, 544 may be uniform or non-uniform, as needs dictate. Exemplary spacing for a thirty-inch seal 500 ranges from about every 1.0 inch (+/−5%) to about every 3.0 inches (+/−5%).

Figure 11:
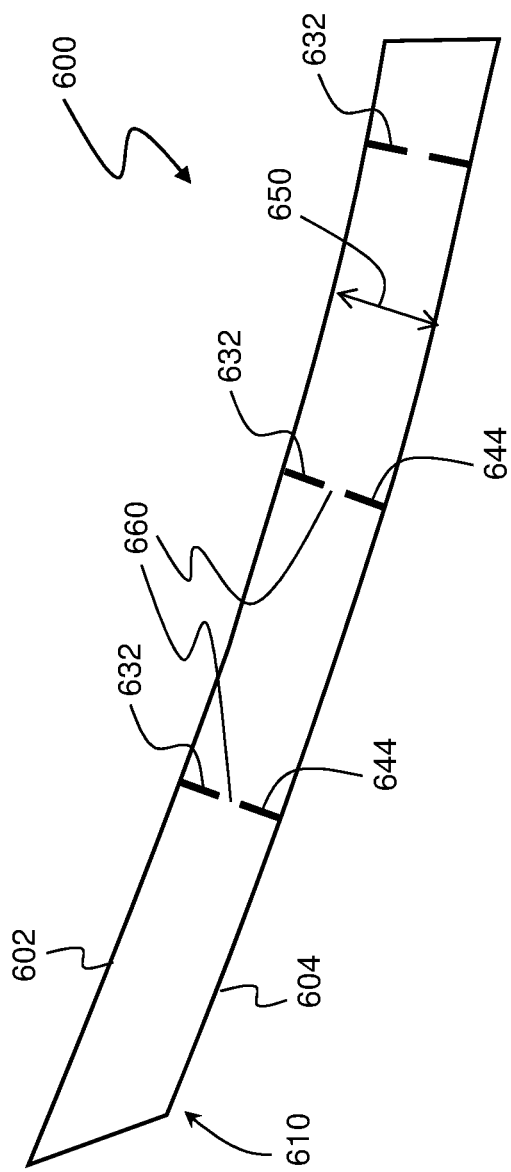
FIG. 11 is a plan view of a portion of a seal having a third arrangement of relief cuts, according to a third aspect of the present disclosure.

FIG. 11 is an enlarged plan view of a forward end 610 of a seal 600, according to another aspect of the present disclosure. In this embodiment, a first set of relief cuts 632 extends inwardly from a first edge 602, and a second set of relief cuts 644 extends inwardly from a second edge 604. The relief cuts 632, 644, which are axially aligned with each other, extend from the respective edges 602, 604 over a distance from at least 20% of the seal width 650 to 40% of the seal width, resulting in a small area 660 being defined between the inward ends of the respective relief cuts 632, 644. If more than one seal ply is used, the relief cuts 632, 644 are made through each ply in the same locations. The spacing of the relief cuts 632, 644 may be uniform or non-uniform, as needs dictate. Exemplary spacing for a thirty-inch seal 600 ranges from about every 1.0 inch (+/−5%) to about every 3.0 inches (+/−5%).

FIG. 12 is an enlarged plan view of a two-ply seal 700 and, more specifically, the forward ends 710, 720 of each seal ply 705, 715. Each seal ply 705, 715 has a seal width 750. In the illustrated embodiment, the width 750 is the same for each ply 705, 715, although other embodiments may include plies 705, 715 of different widths.

The seal ply 705 includes a first edge 702 and a second edge 704, defining the seal width 750 therebetween. A series of relief cuts 732 extend inwardly from the first edge 702 over a distance from at least 40% of the seal width 750 to about 65% of the seal width 750. The relief cuts 732 may be provided with the stress-relieving features shown in FIG. 10, if desired.

The seal ply 715 includes a first edge 712 and a second edge 714, defining the seal width 750 therebetween. A series of relief cuts 744 extend inwardly from the second edge 714 over a distance from at least 40% of the seal width 750 to about 65% of the seal width 750. The relief cuts 744 may be provided with the stress-relieving features shown in FIG. 10, if desired.

FIG. 13 is an enlarged plan view of the seal 700, as assembled. Assembly may involve joining the two plies 705, 715 in a continuous or discontinuous manner. The relief cuts 744 in the second ply 715 are offset from the relief cuts 732 in the first ply 705, as shown in FIGS. 12 and 13. Staggering the relief cuts 732, 744 improves the sealing function of the seal 700 by creating a more tortuous path for air to flow around and through the relief cuts 732, 744.

The spacing of the relief cuts 732, 744 may be uniform or non-uniform, preferably while maintaining the offset between the relief cuts 732 and the relief cuts 744. In one embodiment where the seal length is about thirty inches, the relief cuts 732 are spaced at intervals of about 3.0 inches (+/−5%) with a first cut approximately 3.0 inches from the forward end 710, while the relief cuts 744 are spaced at intervals of about 3.0 inches (+/−5%) with a first cut approximately 4.5 inches from the forward end 720.

FIG. 14 is an enlarged plan view of a two-ply seal 800 and, more specifically, the forward ends 810, 820 of each seal ply 805, 815. Each seal ply 805, 815 has a seal width 850. In the illustrated embodiment, the width 850 is the same for each ply 805, 815, although other embodiments may include plies 805, 815 of different widths.

The seal ply 805 includes a first edge 802 and a second edge 804, defining the seal width 850 therebetween. A series of relief cuts 832 extend inwardly from the first edge 802 over a distance from at least 40% of the seal width 850 to about 65% of the seal width 850. A series of relief cuts 834 extend inwardly from the second edge 804 over a distance from at least 40% of the seal width 850 to about 65% of the seal width 850, in staggered relationship with the relief cuts 832. The relief cuts 832, 834 may be provided with the stress-relieving features shown in FIG. 10, if desired.

The seal ply 815 includes a first edge 812 and a second edge 814, defining the seal width 850 therebetween. A series of relief cuts 842 extend inwardly from the first edge 812 over a distance from at least 40% of the seal width 850 to about 65% of the seal width 850. A series of relief cuts 844 extend inwardly from the second edge 814 over a distance from at least 40% of the seal width 850 to about 65% of the seal width 850. The relief cuts 842, 844 may be provided with the stress-relieving features shown in FIG. 10, if desired.

FIG. 15 is an enlarged plan view of the seal 800, as assembled. Assembly may involve joining the two plies 805, 815 in a continuous or discontinuous manner. The relief cuts 842, 844 in the second ply 815 are offset from the relief cuts 832, 834 in the first ply 805, as shown in FIGS. 14 and 15. Staggering the relief cuts 832, 834, 842, 844 improves the sealing function of the seal 800 by creating a more tortuous path for air to flow around and through the relief cuts 832, 834, 842, 844.

The spacing of the relief cuts 832, 834, 842, 844 may be uniform or non-uniform, preferably while maintaining the offset between the relief cuts 832, 834 in the first ply 805 and the relief cuts 842, 844 in the second ply 815. In one embodiment where the seal length is about thirty inches, the relief cuts 832, 834 are spaced at intervals of about 3.0 inches (+/−5%) with a first cut approximately 3.0 inches from the forward end 810, while the relief cuts 842, 844 are spaced at intervals of about 3.0 inches (+/−5%) with a first cut approximately 1.5 inches from the forward end 820.

In each exemplary seal configurations described above, it should be understood that the seal width may vary along the length of the seal. Thus, where reference is made to a seal width (e.g., seal width 250), it should be understood that the reference number refers to the width of the seal at the location of a given relief cut. That is, if a first relief cut is made at an area with a first seal width "X", then the first relief cut has a cut length of 0.40X to 0.65X. A second relief cut made at an area with a second seal width "Y" has a cut length of 0.40Y to 0.65Y, where X and Y are not equal.

Further, in each exemplary seal configuration described above, it should be understood that the relief cuts may be normal to the respective edge from which they originate or may be oriented at an angle relative to the respective edge from which they originate. It is not required that each relief cut from a given edge or within a given seal be oriented at the same angle (normal or otherwise). Rather, each individual relief cut may be oriented at an angle (normal or otherwise) that is appropriate to achieve the desired flexibility among sections of the seal.

Additionally, while FIG. 4 illustrates a bifurcated seal 140, 160, it should be understood that the seals described in FIGS. 7 through 15 may be used as the branch 145, 165 that extends through the seal slots 185, 175.

As discussed above, conventional sealing arrangements employ several rigid seals that are positioned end-to-end within a curved seal channel between the liner segments of integrated combustor nozzles when a plurality of integrated combustor nozzles is assembled circumferentially adjacent to one another in a segmented annular combustor assembly. There are several disadvantages in using these straight seals, including a complex assembly process to ensure the seals do not fall out or become crushed and a greater leakage rate. In addition, these rigid seals cannot be removed easily without disassembling the segmented annular combustor by removing at least one integrated combustor nozzle adjacent the seals to be removed.

In contrast to those conventional arrangements, embodiments of the present disclosure provide simple and improved installation of flexible seals between the liner segments that help to define the annular combustor assembly. The adjacent liner segments are designed to define an opening at least at an open forward end of the seal slot for receiving and removing the flexible seal. This provides ease of installing and removing the seal from a curved seal channel, by pushing or pulling in an axial direction, without disassembling the combustor assembly. The use of continuous, flexible seals advantageously reduces (i) the number of rigid seals (i.e. number of pieces) inserted in the seal slot along the seal length and (ii) the amount of leakage around the seal. Moreover, the relief cuts in the seals accommodate any radial misalignment of the seal slots that may occur as a result of machine tolerances or thermal growth.

Exemplary embodiments of the curved seal and methods of installing the same are described above in detail. The methods and seals described herein are not limited to the specific embodiments described herein, but rather, components of the methods and seals may be utilized independently and separately from other components described herein. For example, the methods and seals described herein may have other applications not limited to practice with integrated combustor nozzles for power-generating gas turbines, as described herein. Rather, the methods and seals described herein can be implemented and utilized in various other industries.

While the technical advancements have been described in terms of various specific embodiments, those skilled in the art will recognize that the technical advancements can be practiced with modification within the spirit and scope of the claims.

What is claimed is:

1. A flexible seal for sealing between two adjacent components of a gas turbine, the flexible seal comprising:
    at least one metal ply extending between a forward end and an aft end axially separated from the forward end, the at least one metal ply curving continuously from the forward end to the aft end in a circumferential direction of the gas turbine, such that the aft end is circumferentially offset from the forward end; and
    wherein a plurality of relief cuts is defined through the at least one metal ply between the forward end and the aft end.

2. The flexible seal of claim 1, wherein the seal has an axial length between 5 inches and 50 inches.

3. The flexible seal of claim 2, wherein the at least one metal ply comprises a plurality of plies joined together at one or more locations along the axial length; and wherein the plurality of relief cuts includes a first set of relief cuts defined through a first ply of the plurality of plies and a second set of relief cuts defined through a second ply of the plurality of plies.

4. The flexible seal of claim 2, wherein the plurality of relief cuts is distributed uniformly along the axial length.

5. The flexible seal of claim 1, wherein the at least one metal ply defines one or more inflection points only in a radial direction, when the flexible seal is installed between the two adjacent components of the gas turbine; and wherein the plurality of relief cuts includes a pair of relief cuts at each of the one or more inflection points.

6. The flexible seal of claim 1, wherein the plurality of relief cuts includes a first set of relief cuts defined from a first edge of the at least one metal ply and a second set of relief cuts defined from a second edge of the at least one metal ply; and wherein a first relief cut of the first set of relief cuts is proximate to a second relief cut of the second set of relief cuts.

7. The flexible seal of claim 1, wherein at least one relief cut of the plurality of relief cuts extends inwardly from an edge of the at least one metal ply and includes a stress-reducing feature at a terminal end of the relief cut inboard of the edge.

8. The flexible seal of claim 1, wherein a first relief cut of the plurality of relief cuts is disposed at a first axial location and extends inwardly from a first edge of the at least one metal ply; and wherein a second relief cut of the plurality of relief cuts is disposed at the first axial location and extends inwardly from a second edge of the at least one metal ply opposite the first relief cut.

9. A flexible seal for sealing between two adjacent gas turbine components, the flexible seal comprising:
- a forward end and an aft end, wherein the aft end is axially, radially, and circumferentially offset from the forward end;
- a first edge and a second edge opposite one another and extending between the forward end and the aft end;
- wherein a continuous circumferential curve is defined between the forward end and the aft end;
- wherein a plurality of relief cuts is defined through the flexible seal between the forward end and the aft end; and
- wherein a first relief cut of the plurality of relief cuts extends from the first edge towards the second edge, and wherein a second relief cut of the plurality of relief cuts extends from the second edge towards the first edge.

10. The flexible seal of claim 9, wherein the seal has an axial length between 5 inches and 50 inches.

11. The flexible seal of claim 10, wherein the flexible seal comprises a plurality of plies joined together at one or more locations along the axial length; and wherein the plurality of relief cuts includes a first set of relief cuts defined through a first ply of the plurality of plies and a second set of relief cuts defined through a second ply of the plurality of plies.

12. The flexible seal of claim 10, wherein the plurality of relief cuts is distributed uniformly along the axial length.

13. The flexible seal of claim 9, wherein the flexible seal defines one or more inflection points only in the radial direction, when the flexible seal is installed between the two adjacent gas turbine components; and wherein the plurality of relief cuts includes a pair of relief cuts at each of the one or more inflection points.

14. The flexible seal of claim 9, wherein the plurality of relief cuts includes a first set of relief cuts defined from the first edge of the flexible seal and a second set of relief cuts defined from the second edge of the flexible seal; and wherein the first set of relief cuts and the second set of relief cuts are in an axially alternating arrangement.

15. The flexible seal of claim 9, wherein at least one relief cut of the plurality of relief cuts extends inwardly from the first edge of the flexible seal and includes a stress-reducing feature at a terminal end of the relief cut inboard of the first edge.

16. The flexible seal of claim 9, wherein the first relief cut of the plurality of relief cuts is disposed at a first axial location and extends inwardly from the first edge of the flexible seal; and
- wherein the second relief cut of the plurality of relief cuts is disposed at the first axial location and extends inwardly from the second edge of the flexible seal opposite the first relief cut.

* * * * *